Sept. 21, 1954

F. M. POTGIETER 2,689,468

UNIVERSAL JOINT

Filed May 22, 1951

Inventor:
Fred M. Potgieter
By H. J. Schmid
Atty

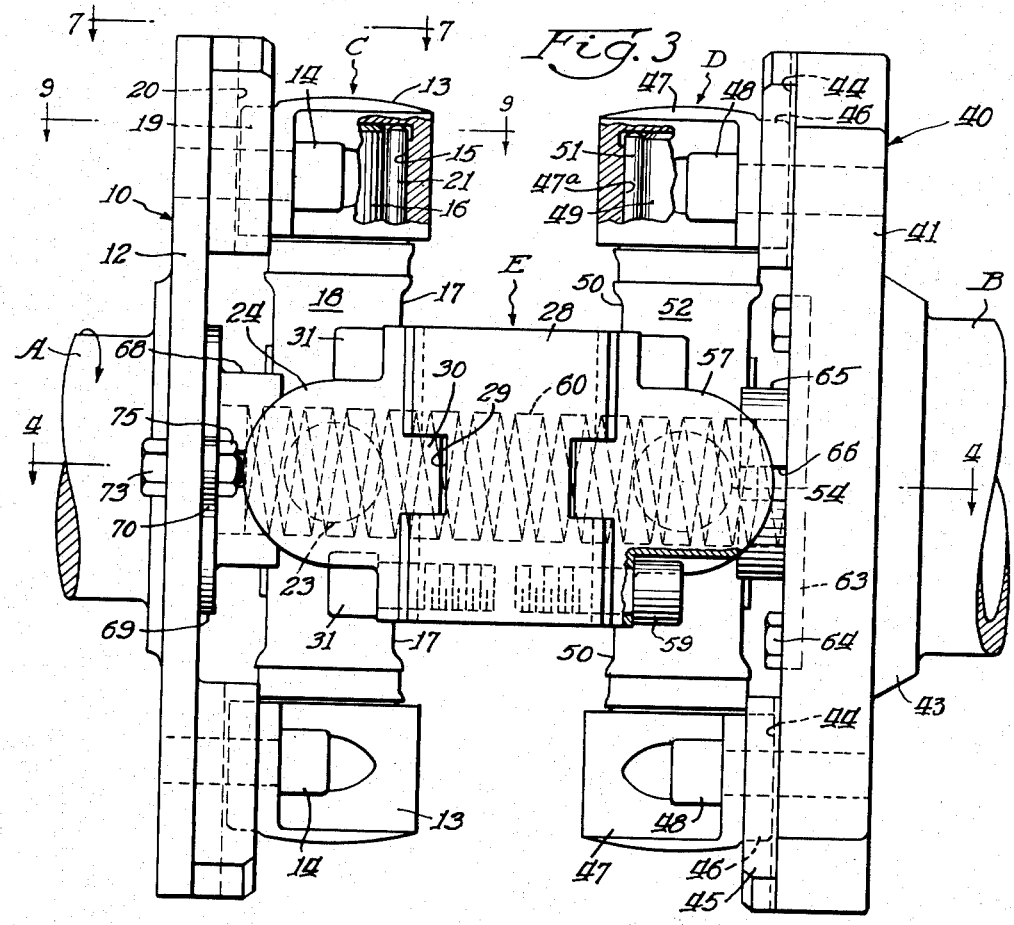

Sept. 21, 1954
F. M. POTGIETER
2,689,468
UNIVERSAL JOINT
Filed May 22, 1951
4 Sheets-Sheet 3
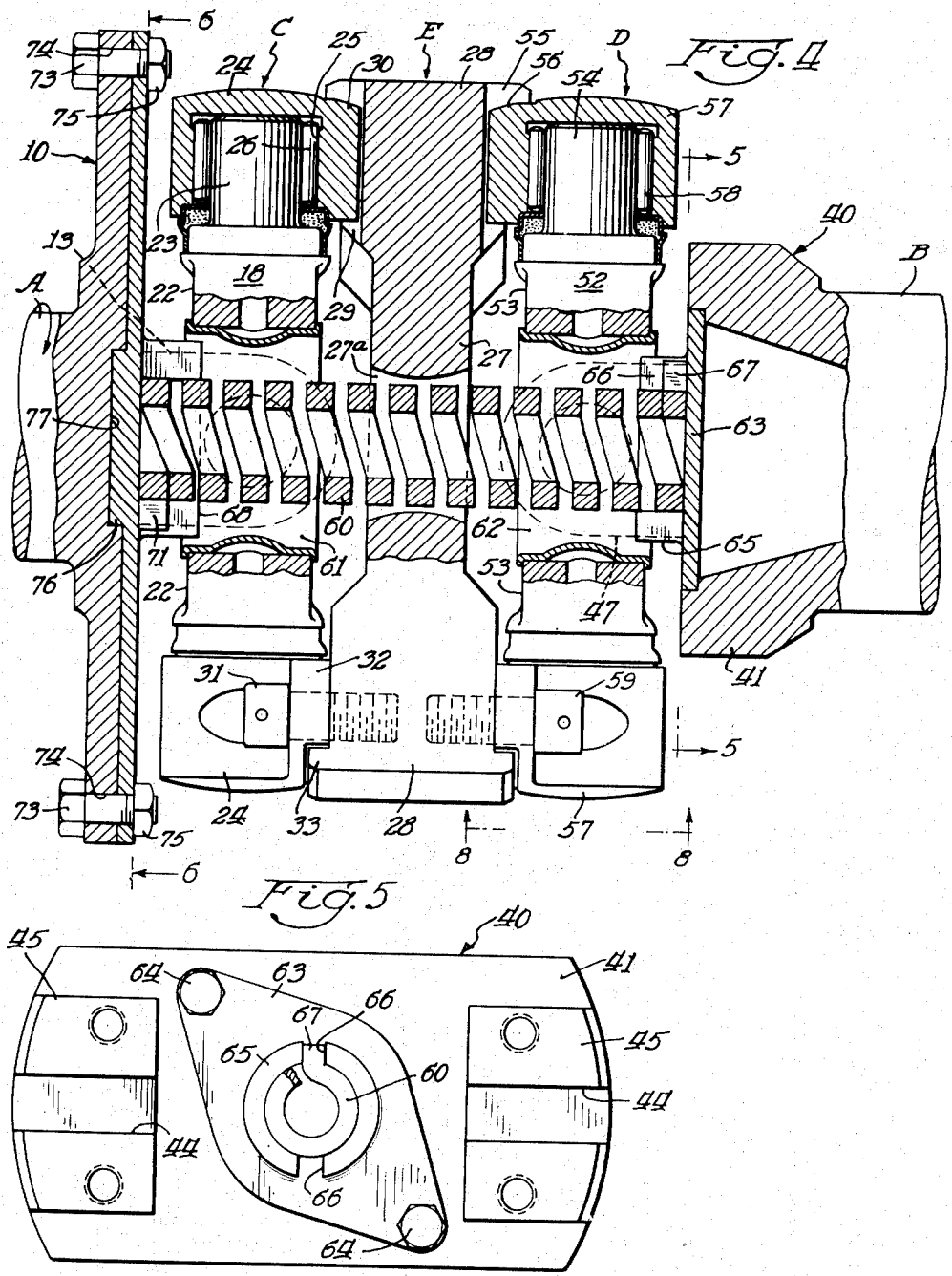
Inventor:
Fred M. Potgieter Sept. 21, 1954     F. M. POTGIETER     2,689,468
UNIVERSAL JOINT
Filed May 22, 1951     4 Sheets-Sheet 4
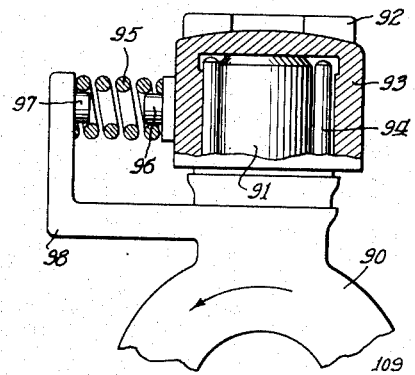
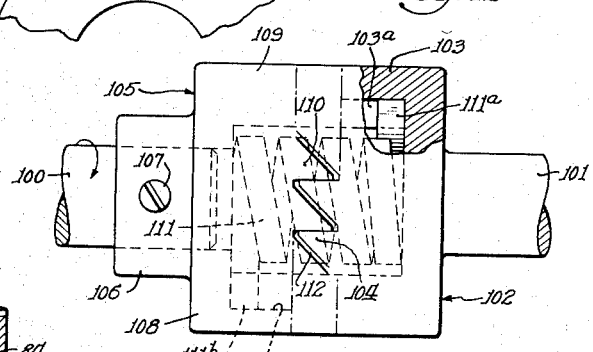
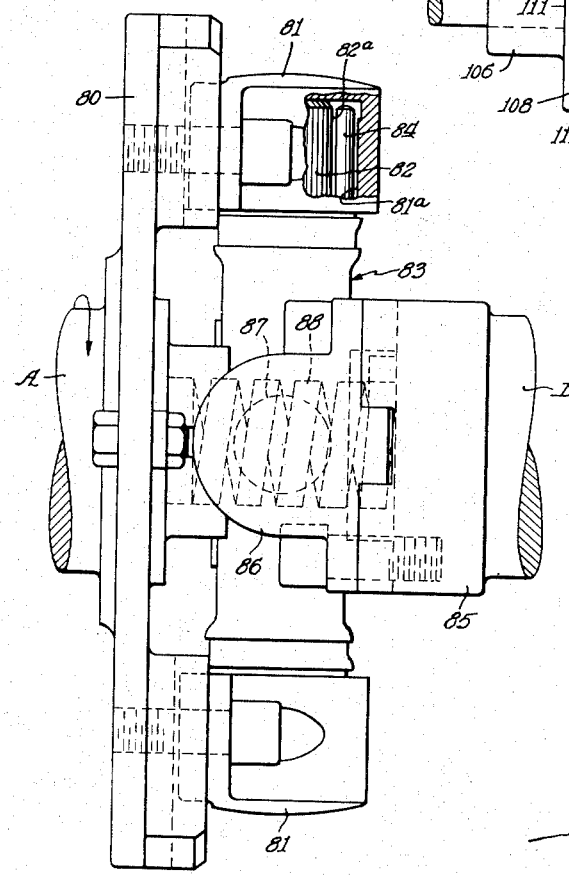
Inventor:
Fred M. Potgieter
By N. J. Schmid
Atty

Patented Sept. 21, 1954

2,689,468

UNITED STATES PATENT OFFICE 2,689,468

UNIVERSAL JOINT

Fred M. Potgieter, Rockford, Ill., assignor to Borg-Warner Corporation, Chicago, Ill., a corporation of Illinois Application May 22, 1951, Serial No. 227,657

3 Claims. (Cl. 64—21)

The present invention relates in general to universal joints and has particular reference to what are usually known as close-coupled double universal joints. This type of universal joint is characterized by the arrangement of a center plate or member between two universal joint assemblies for transmitting torque from one of these assemblies to the other assembly regardless of the angular relationship between the axes of the re- respective assemblies or the shafts to which said assemblies are secured.

In a tractor driven by a gasoline or diesel engine through a clutch and transmission, with a universal joint or other flexible means between the flywheel and the transmission it has been found that, during idling of the tractor engine when not pulling a load, fluctuations in angular velocities of the shaft coming from the flywheel are not transmitted uniformly to the transmission shaft when there is looseness in the flexible connection between the flywheel and transmission so that backlash in the flexible connection sets up a pounding action due to the variation in angular velocity between the flywheel and the driven shaft which is detrimental to the flexible connection. In a roller bearing universal joint, a limited looseness exists between the inner race, rollers and outer race of the bearings in the joint causing the rollers to brinell into the races. The present improvements are designed to preload the universal joint, torsionally in the direction in which it is carrying the load, by means of springs or other connections which are sufficient to overcome the inertia of the driven member so that it accurately follows all the fluctuations in angular velocity of the flywheel and maintains the load in one direction at all times in the roller bearings of the joint. Thus, the inner race, rollers and outer race of these bearings are kept in contact in the direction in which they are carrying torque and do not rattle or pound themselves to pieces.

It is known that bearings may be preloaded by making all of the rollers of oversize uniform diameter to tightly engage the inner and outer races so that the rollers must be assembled by forcibly inserting them between the inner and outer races. In this type of preloading, when the coupling is used for a short period of time, its preloaded effect becomes lost because both the races and the rollers wear resulting in a loose fit of the rollers between the inner and outer races. Also in this type of preloading with oversize rollers, the bearing is preloaded around its entire periphery, whereas the present arrangement contemplates a preloading by torsionally offsetting the inner and outer races by spring means so that the bearing is preloaded only approximately one-half of its periphery.

The improvements contemplated herein are particularly directed to novel means which are effective to maintain antifriction rollers in constant contact with the surfaces of bearing cups and the associated trunnions throughout the loaded regions of the bearings. The present arrangement has been found to be quite effective in preventing damage being done to the rollers or the adjacent surfaces of the races which heretofore has been attributed to looseness between the rollers and the races at the loaded sides of the bearings in universal joints as well as other flexible connector means.

Tractors and other heavy duty machinery are usually powered by diesel engines which are coupled by universal joints to the traction wheels and the like. These assemblies are inherently subject to considerable torsional vibration which creates excessive backlash at the bearings and in the antifrictional members in the universal joints. This backlash reduces the life span of the rollers or cups, or both, because it produces a certain amount of brinelling due to the high power of the impact received by the rollers and the associated raceways in the bearings.

Prior efforts to maintain antifriction rollers in parallelism in the bearing cups, while successful to a limited extent, these prior structures have usually been expensive to produce as well as difficult to install, and in addition they frequently require replacement or repair. Furthermore, these prior attempts to solve the problem which the present improvements have successfully overcome, have generally been subject to serious objections by automotive and mechanical engineers because of the complicated arrangements therein, so that these efforts have received only limited acceptance by motor vehicle manufacturers.

An important advantage of the present arrangement resides in the fact that the bearing rollers are constantly maintained at their normally loaded regions of their raceways under additional load by torsional spring means thereby preventing any possibility of these rollers being affected during periodical occurrences of backlash to which the universal joints are frequently subjected, and particularly when the prime mover is a motor of the diesel type. Furthermore, the torsional or spring means tends to subtract from the capacity of the joint because the bearings, before any load is transmitted by the joint, are already loaded in an amount equal to the torsional spring so that the load in the bearings in the joint is a sum of the load being transmitted plus the effect of the spring.

It is therefore one of the principal objects of the present invention to provide means in universal joints, preferably of the close-coupled double type, which will effectively insure the maintenance of the bearing rollers in a preloaded condition so that they are not affected by periodic occurrences of backlash transmitted from the diesel engine.

Another principal object contemplated by the arrangement disclosed herein is to provide means whereby suitable pressure or torsion is applied to certain portions of a close-coupled double universal joint assembly, such torsion being set up in the direction of he torque load exerted by the rollers thereby preventing the rollers races on the rollers thereby preventing the rollers inadvertently assuming positions where they are likely to become damaged and thus hinder proper operation of the assembly.

A further object hereof is to provide an elongate torsional spring which passes through at least the major portions of both of the joints as well as the center plate of a double universal joint assembly, such spring being connected at its ends to the respective joints. Also, means are provided for fixedly anchoring one end of the torsional spring to one yoke, and movable or adjusting means receive the other end of the spring from modifying the degree of torsion exerted thereby. It is apparent that when this double joint is used in an assembly which may not be subject to heavy duty and excessive backlash from the engine, the spring may be loosened to reduce or wholly release the tension imparted thereby to the respective joints. Manifestly, the same double or close-coupled universal joint may be used in both types above mentioned without mechanical alteration except as to the modifying of the spring tension.

Other objects, aims and advantages of the improvements contemplated herein will be apparent to persons skilled in the art after understanding the construction and operation thereof from the within description. It is preferred to accomplish the numerous objects of the invention and to practice the same in substantially the manner hereinafter fully described and as more particularly pointed out in the appended claims. Reference is now made to the accompanying drawings that form a part of the specification.

In the drawings:

Fig. 1 graphically illustrates a power driving and transmission assembly, comprising a prime mover and multiple speed gearing, coupled together by double universal joints in which the present improvements are applicable;

Fig. 3 is a side elevation showing details of the universal joint assembly illustrated in Fig. 1, and illustrating the manner in which the present improvements may be incorporated therein, the upper bearings being in axial section;

Fig. 4 is a longitudinal section taken on the plane of line 4—4 on Fig. 3, with the lower portions in elevation;

Fig. 5 is a face elevation of the right hand yoke member viewed on the plane of line 5—5, Fig. 4, and showing the fixed anchorage of the torsion spring;

Fig. 7 is a fragmentary view of an end of a driving yoke and its associated bearing, the view being taken on the plane of line 7—7 on Fig. 3;

Fig. 8 is a fragmentary view of an end of a driven yoke and its associated bearing, the view being taken on the plane of line 8—8 on Fig. 4;

Fig. 10 is a side elevation, partly in section, showing an arrangement for preloading the bearings of a single universal joint by torsion spring means similar to that shown in Figs. 3 and 4;

Fig. 11 illustrates the adaptation of the present torsion preloading principle to a simplified form of universal joint; and, Fig. 12 is a side elevation of a jaw coupling for drive and driven shafts having incorporated therein the present means for preloading by torsion spring means.

The drawings are to be understood as being more or less of a diagrammatic character for the purpose of disclosing typical or preferred embodiments of the improvements contemplated herein, and in these drawings like reference characters identify the same parts in the different views.

Figure 1:
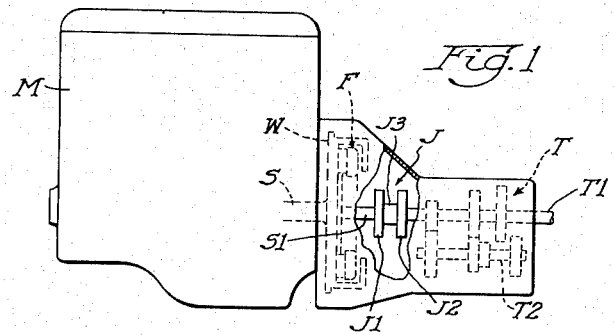

In the exemplary arrangement shown in Fig. 1, the mechanism may comprise a motor M, preferably an engine of the diesel type, the crank shaft S of which carries a flywheel W at its outer end defining the drive member of a driven friction clutch assembly F which drivingly connects said crank shaft to a multiple speed transmission assembly T through the instrumentality of a close coupled double assembly J characterized by a forward universal joint J-1, and a rearward universal joint J-2, with a power transmitting center member J-3 connecting these joints. A shaft S-1 connects clutch F to the forward universal joint J-1, the main shaft T-1 of the transmission is connected to the rearward universal joint J-2; and suitable variable speed gearing connects said main transmission shaft to the auxiliary shaft T-2. As hereinbefore stated, during idling periods of the motor, the driven transmission shaft T-1 and the universal joints are subject to backlash due to variations in angular velocities between the flywheel or drive shaft and the driven shaft. This backlash is detrimental in that it sets up a pounding in the flexible connection or universal joint assembly which frequently injures the bearings and rollers of said connection or joint. The tabulated curves on the graph (Fig. 2) show typical variations of angular velocity plotted against time between a drive shaft, such as S in Fig. 1, and a driven or transmission shaft, such as T-1. The torsion spring means contemplated by the present improvements is effective to bring the curve of the driven shaft into coincidence with the curve of the driving shaft.

One type of mechanism embodying the present improvements, and shown in Figs. 3 to 9, will now be described in detail. The power or drive shaft in these figures is identified as A and the take-off or driven shaft is identified as B. These shafts A and B may be arranged in axial alignment or in parallel offset planes, or as is frequently the case, the axes of said shafts may have oblique relationship to each other, depending upon the particular installation and the service required of the close-coupled double universal joint arrangement. The drive shaft A carries an adjacent or terminal yoke of a first universal joint C, and the driven shaft B carries an adjacent or output yoke of the second universal joint D. The universal joints C and D are close to each other to provide a double assembly wherein these joints are drivingly connected in a closely coupled manner by a power transmitting member or center plate E.

Figure 2:
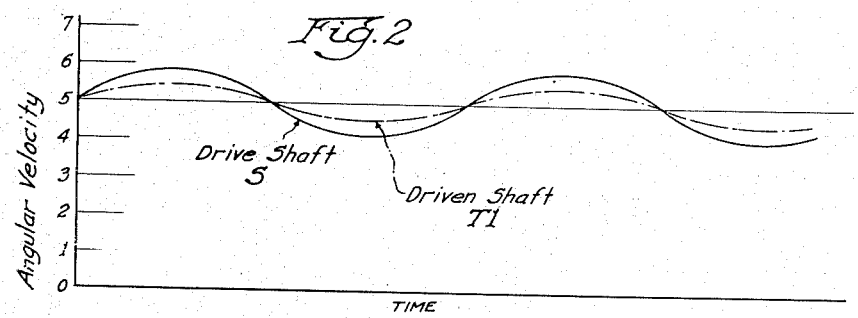
Fig. 2 is a chart showing relative angular velocities of the driving and driven shafts of Fig. 1, plotted against time.

The universal joint C comprises a terminal coupling member or yoke 10 which may be a separate member or, as shown in Figs. 1 and 2, it may comprise a radial annular flange 12 at the end of motor crank shaft or drive shaft A. This yoke 10 carries axially aligned bearing cups 13 which preferably are separate from the yoke and are attached thereto by cap screws 14. These cups 13 have coaxial bores defined by cylindrical bearing walls 15, and said bores open radially inward toward each other to receive the reduced trunnion ends 16 of one pair of aligned coaxial cross-arms 17 of the intermediate transmission member or spider 18. The cups 13 have outer radial ribs or lugs 19 at their sides next the flange which ribs are engaged in counterpart channels or slots 20 in the yoke flange 12, thereby to rigidly hold said cups in alignment and also assume the torque load transmitted between the yokes of the assembly. Antifriction members in the form of an annular row of cylindrical rollers 21 are arranged in the cups between the surfaces 15 of the bores and the adjacent trunnion surfaces 16 of the spider. Thus it is apparent that the inner segments of the rollers 21 have rolling engagement with the cylindrical bearing surfaces of the trunnions 16 and at their outer segments have rolling contact with the inner bearing surfaces 15 of the bores.

The second pair of aligned cross-arms 22 of the spider in assembly C, which are arranged at a 90° angle to the arms 17, also have trunnions 23 at their outer portions which are journaled in coaxial bearing cups 24 having aligned cylindrical bores 25, and between these bearings and said trunnions there is an annular row of antifriction rollers 26. The output yoke, which cooperates with the bearing cups 24, comprising that region of the center plate E which is alongside the bearing cups 24. As will be seen in Figs. 3 and 4, the center plate E has a generally rectangular contour and its central region 27 is of less thickness than the radial end regions 28 and said plate has an axial aperture 27a. Radial slots or channels 29 are made in the surfaces of the end regions 28 in confronting relationship to the adjacent bearing cups 24, and the flat sides of these cups have radially extending lugs 30 which are entered in the aforesaid slots 29. Cap screws 31 pass through ears 32 at the sides of each bearing cup 24 and are threaded into the end regions 28 of the center plate for attaching said cups to the plate. Also there are outwardly extending shoulders or lips 33 at the ends of the center plate overlying and engaged with the outer ends of the cups thereby relieving the cap screws of a portion of the load imparted thereby by end thrust and torque.

The other or driven universal joint D comprises a terminal yoke 40 defined by a radially elongate plate 41 that may be integral with enlarged forward end 43 of driven or take-off shaft B. This yoke plate 41 has radially aligned channels or grooves 44 in blocklike embossments 45 to receive counterpart ribs or tenons 46 extending along the adjacent regions of generally cylindrical bearing cups 47 that are attached to the yoke plate 41 by cap screws 48 in the manner shown in Fig. 3. These bearing cups 47 have coaxial bores which open toward each other and define cylindrical walls 47a in which the trunnion ends 49 of a coaxial pair of arms 50 are journaled by means of an annular row of antifriction rollers 51. The arms 50 are a portion of an intermediate power transmission member or spider 52 which also has a second pair of coaxial arms 53, at right angles to the first pair of arms 50, and have reduced trunnions 54 as seen in Fig. 4. The outer end regions 28 of the center plate or connector member E, as hereinbefore mentioned, is common to both of universal joint assemblies C and D, and it also defines the forward or second yoke structure of the driven universal joint assembly D. The adjacent outer end regions of center plate E have aligned radial grooves or channels 55 which receive the counterpart ribs or tenons 56 projecting away from the adjacent sides of bearing cups 57. The end trunnions 54 are journaled in cups by means of annular rows of antifriction rollers 58 as shown in Fig. 4. Cap screws 59 anchor the bearing cups 57 to the adjacent portions of center plate E.

Universal joints as hereinbefore described are frequently subject to blacklash when driven by prime movers of diesel engine type. It has been recognized that this backlash is due to variations of speed of the diesel engine. When the arrangement is installed on tractors and other vehicles for performing heavy duty work, there are variations in the angular velocities of the drive and driven shafts which are connected by universal joints. This backlash usually occurs at the bearings in the universal joints and is due to the tolerances between the bearing rollers and the race surface on the spider trunnions and the surrounding cups and seriously affects the parallelism of the rollers of each bearing cup where the torque is applied. By preloading this side region of a bearing cup during operation appears to be effective to retain the adjacent rollers in proper contact with the race surfaces of the cups and trunnions, thus keeping this group of rollers in definite parallel positions with respect to each other so that none of them will tend to cant or twist out of proper relationship to the others.

The arrangement contemplated by the present improvements is effective to preload each bearing cup and the plurality of rollers at the region of each cup which is transmitting torque, thereby insuring that these rollers are maintained in proper position and in intimate contact with the inner and outer races defined by the universal joint trunnions and the bearing cups which surround the respective trunnions.

This novel improvement, which is illustrated in detail in Figs. 3 and 4, will now be described. The terminal or input yoke structure 10 of the first of assembly C is directly connected, by means such as a spring 60, with the terminal or output yoke structure 40 of the second assembly D. This spring means, which is preferably of the coiled torsional type, passes through an axial opening 61 in the first spider 18, the opening 27a of the center plate E, and an axial opening 62 in the second spider 52, and the ends of said spring means are suitably anchored to the extreme front and rear yokes 10 and 40 respectively.

The anchorage means for the spring at the rear yoke 40 is shown in detail in Fig. 5, and comprises an elongate anchor plate 63 which is attached by bolts 64 to the forward or front face of the yoke plate 41 between the embossments 45 thereon and said anchor plate has an axially arranged hollow cylindrical or annular stub 65 projecting therefrom in a forward direction from said anchor plate and may extend partly into the axial opening 62 of the second or rear spider 52. The circumference of the inner surface of stub 65 is approximately the same as the external circumference of the torsional spring 60 to effect a snug fit between these parts, and said stub has interruptions or recesses 66 which may be arranged diametrically opposite each other. The adjacent terminal convolutions of spring 60 are forced into this stub and for the purpose of arresting rotative movement of these convolutions the terminal end of the spring is bent outward at an angle to provide a radial finger 67 which projects into one of the recesses 66 of the stub and thus locks this end of the spring in position and against rotation.

Figure 6:
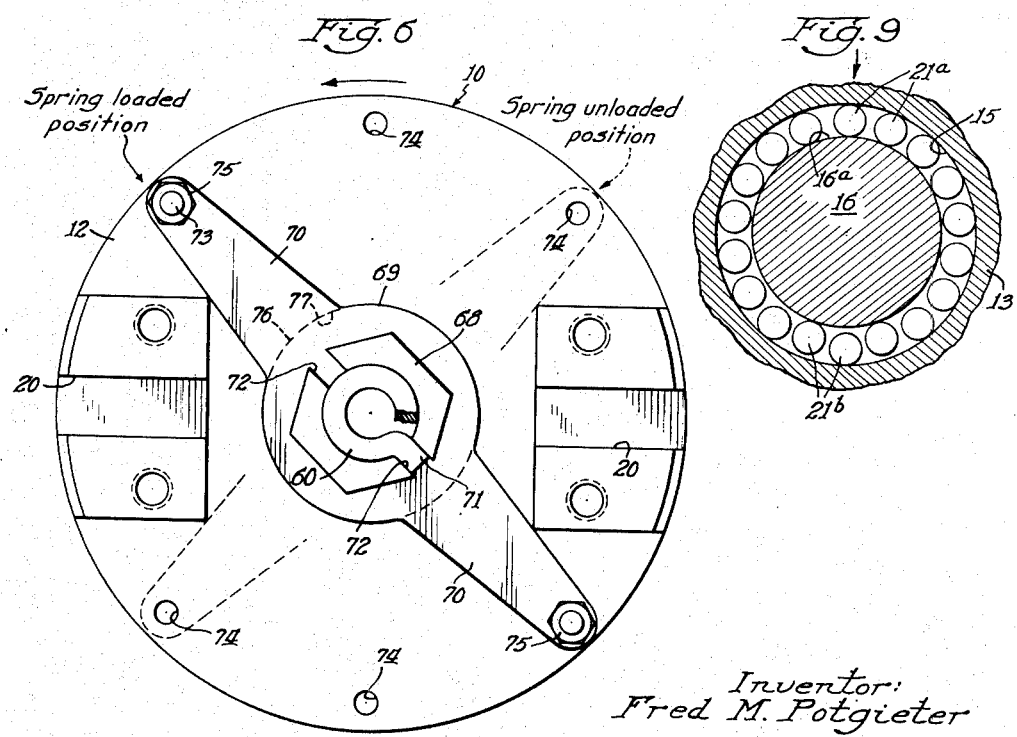
Fig. 6 is a face elevation of the left hand yoke member viewed on the plane of line 6—6, Fig. 4, and showing the lever means for adjusting the tension of the torsion spring.

At its other or forward end the spring member is mounted in a device which is capable of rotative movement for varying the torsion of said spring, or may be set to release the action of the spring, as shown in Fig. 6. This adjusting device preferably comprises a hollow retainer or socket 68 of angular outer contour that is formed on an annular hub portion 69, and has a plurality of radially projecting arms 70, preferably two, as shown. The retainer 68 has a cylindrical inner wall, of proper diameter to snugly seat a plurality of convolutions at this forward end of spring 60, and there is a radially bent finger 71 at the terminal end of the spring which is inserted in one of a plurality of recesses or interruptions 72 in the wall of the socket 68.

A spring adjusting device is secured against the confronting rear face of the yoke plate 10 by bolts 73 which pass through the outer regions of the arms 70 and are inserted through holes 74 in the yoke plate 10 with clamping nuts 75 screwed onto their protruding ends to hold the parts in assembly. At the back surface of the lever member there is a disc-like circular boss 76 which is seated in an annular counterpart recess 77 in the adjacent face of yoke plate 10, as shown in Fig. 2, thus permitting the lever member to be rotated when it is desirable to vary the torsion of spring 60. In order to effect this adjustment the angular outer surface of the retainer socket is gripped by a wrench to prevent unintentional rotation thereof when the device is released. With the wrench held firmly, the bolts 73 are removed, and then the device is rotated in recess 77 by moving the wrench in one direction or the other to either loosen or tighten the torsion of the spring, as the case may be, after which the bolts are inserted through the arms 70 and through the selected holes 74 which have been registered with the bolt holes at the ends of the arms. It will be seen that different positions of the arms are possible by this arrangement. In one position of the adjusting means, the torsion of the spring will be released so that it is not effective on the bearings and the double joint assembly may be used as a power transmission structure where heavy duty is not expected of the mechanism, as for example when the double universal joint is connected to a take-off mechanism for actuating accessories which do not require heavy driving power.

Figure 9:
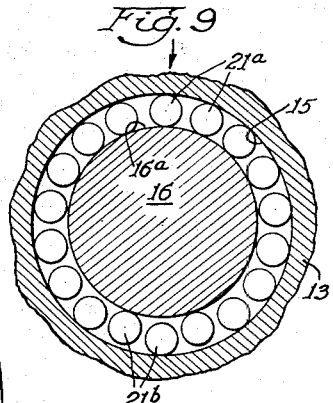
Fig. 9 is a somewhat exaggerated schematic view of a roller bearing assembly illustrating the preloading thereof by means of the present improvements, the view being a fragmental section on line 9—9 on Fig. 3.

Fig. 9 schematically illustrates the results which are attained by the improvements hereinbefore described. In this view the torsional spring means exerts constant preloading pressure against the bearing in the direction of the arrow at the top of the figure so that the adjacent group of rollers designated as 21a in the loaded segment of the bearing cup 13 are maintained in intimate contact with the race surface 15 of the cup and with the opposing race surface 16a of trunnion 16. Also it will be noted that the remaining series of rollers designated as 21b, which are not directly affected by the driving torque but are traveling around the trunnion 16, are beyond the influence of the torsional spring means, so that these latter rollers 21b may be assumed to be in a somewhat "floating" state for the reason that they are out of contact with one or the other race surfaces. Hence it will be apparent that the torsional spring means, exerting its force towards the torque transmitting region of the bearing, effectively takes up the tolerance or clearance space at the region of the bearing while transmitting torque and dampens out any backlash to which the bearing may be subject by reason of variations of angular velocities between the drive and driven shafts which are coupled by a universal joint assembly or other connecting device.

A simple form of a universal joint assembly is illustrated in Fig. 10 coupling the drive shaft A to the driven shaft B. The yoke member 80, carried by the drive shaft, supports axially aligned bearing cups 81 surrounding the trunnions 82 of a cross or spider 83, and rollers 84 are interposed between the inner or trunnion race surface 82a and the outer or bearing cup race surface 81a. The adjacent end of the driven shaft B carries a yoke member 85 with its axially aligned antifrictional bearing cups 86 surrounding the spider trunnions 87 which are at right angles to the first mentioned trunnions 82. It will be understood that the rollers 84 are arranged in an annular row between the races, and also that the spider 83 has therein a central opening corresponding with the openings 61 and 62 in the spiders of the universal joint assemblies C and D shown in Fig. 4. In the assembly disclosed in Fig. 10 the yokes 80 and 85 are directly connected by a coiled torsional spring member 88 the terminal convolutions of which are anchored to the respective yokes, and the intermediate region of the spring extends through the spider opening 83. For the purpose of brevity the spring anchoring means are not described in detail since said means correspond with the hereinbefore described arrangement with respect to Figs. 3 and 4. However, it may be mentioned that the rearward end of the spring 88 is fixedly anchored to yoke 85 by a structure which is similar to that shown in Fig. 5, and the forward end of said spring is secured to yoke 80 by a structure such as illustrated in detail in Fig. 6 which is adapted for adjustable rotative movement to vary or to release the tension of the torsional spring in the manner previously described herein.

Another typical application of the present improvement is disclosed in Fig. 11 wherein the driving spider 90, which rotates in the direction of the arrow, has a radial trunnion 91, and the driven yoke 92 has a bearing cup 93 surrounding the annular row of rollers 94. The torque transmitting region in this assembly is at the left side of trunnion 91 where the rollers 94 are shown in contact with the race surfaces of both the cup and the trunnion. The torsional preloading arrangement comprises the coil spring 95 having one end seated around a stub 96 on the exterior of the cup and has its other end seated around a stub 97 on the upturned portion of an L-shaped bracket arm 98 which extends radially outward from the region of the spider 90 inwardly of the trunnion 91. When the spring is seated, the force or compression of the spring is exerted against the bearing cup at the loaded or torque transmitting region thereof and will take up the tolerances between the adjacent group of rollers and the race surfaces of the cup and trunnion.

As hereinbefore stated, the present improvements are applicable to other types of coupling assemblies. In Fig. 12 there is shown a jaw type of coupling or clutch connecting the proximate ends of a drive shaft 100 and a driven shaft 101 and having the present improvements incorporated therein. The end of driven shaft 101 carries a hollow cylindrical or cup-shaped connector member 102 defined by an annular flange 103 with tapered angular jaw teeth 104 projecting axially at the rim of said flange. The drive shaft 100 adjustably supports a connector member 105 comprising a hub portion or collar 106 mounted for sliding movement on said drive shaft toward and away from the opposing or driven connector member 103 and is also adapted for rotative adjustment around the shaft to which it is secured in position by a set screw 107. A cup-shaped member 108 is formed integral with the hub or collar 106, said member being defined by an axially extending cylindrical flange 109 the rim portion of which has tapered angular jaw teeth 110 which are counterparts of the opposing jaw teeth 104 and are arranged normally in mesh therewith. When the axially extending faces of the opposing jaw teeth 104 and 110 are engaged, and the coupling is rotated by the drive shaft 100 in the direction of the arrow, there are clearances 112 between the slanting or oblique faces of the respective teeth, and said clearances, under ordinary operating conditions, would cause chatter and backlash between the opposing teeth due to varying annular velocities between the driving and driven shafts. The coiled torsional spring 111 connecting the couplings 102 and 105 successfully dampens out this objectionable backlash by exerting tension to preload the opposing members of the coupling in the same manner as hereinbefore described with respect to the preloaded bearings of the universal joint assemblies. The terminal end of the spring next the inner face of connector member 102 is bent radially outward as at 111a and is seated in an axially extending channel 103a in the flange. Similar anchoring means are provided for the forward terminal end of spring 111 such means being defined by a radially bent end 111b which is engaged in the axially extending channel 109a of the annular flange on coupling member 105. When it is desired to vary the tension of the torsional spring 111, or to release the tension thereof, the set screw 107 is unscrewed so that the coupling member 105 may be rotated on the drive shaft in a direction to wind or unwind the convolutions of the spring 111 to the desired degree, after which the member 105 is locked in position by tightening the screw 107. This arrangement also facilitates the assembly of the parts of the jaw type coupling.

From the foregoing it will be apparent that the present arrangement comprises driving and driven members which are drivingly coupled to each other by mechanism having relatively rotatable elements on a common axis arranged normal to the rotational axis of said members, and that these relatively rotatable elements are pivotally connected to each other by rollers having their axes parallel to said common axis, particularly at the loaded regions of the bearings of said rollers. Also, suitable mechanical means connect the driving and driven members of the universal joint assemblies for exerting pressure continuously on the loaded rollers during transmission of power therebetween to thereby maintain these loaded rollers in proper positions and thus prevent their tilting or twisting out of their normal axis or axes during backlash which occurs during variations of the driving motor speed. The improvements are quite effective in the performance of their functions.

While the invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

What is claimed is:

1. A motor driven power transmitting mechanism which is subject to backlash resulting from vibrations set up by speed variations of the driving motor, said mechanism comprising rotatable axially spaced driving and driven members; a power transmission coupling device drivingly connecting said members; pivotally connected elements; bearing rollers between said elements and said members and disposed radially to the axis of said members; a rotatably adjustable torsional spring anchored at its ends respectively on said drive and driven members and exerting pressure on said rollers to maintain the same in radial relation to the axes of said members thereby to restrain said rollers against tilting out of their radial relationship to said members during backlash due to variations in rotational speed of said mechanism; and a pivoted element mounted on one of said rotatable members for rotational adjustment independently thereof, said element being connected to an adjacent end of said spring for effecting the aforesaid rotatable adjustment thereof to vary the torsion of said spring.

2. A power transmitting mechanism comprising a driving first member; a driven second member; a third member intermediate of and drivingly connecting said first and second members; cooperating yokes and a spider defining a first universal joint assembly between said driving member and said third member; and cooperating yokes and a spider defining a second universal joint assembly between said third member and said driven member; anti-friction roller bearings between the yokes and spiders of the respective universal joint assemblies, the rollers of said anti-friction bearings providing rolling action between the proximate yokes and spiders of the first and second universal joint assemblies and being effective to transmit torque therebetween; an adjustable torsional spring extending between and connected to said driving and driven members and one end of said spring adapted for rotation independent of the adjacent member to vary the tension of said spring, whereby said spring is effective to position the rollers of each bearing in parallelism during the approach of said rollers towards their torque transmitting positions; rotatably mounted radially extending means on one of said members and connected to the adjacent end of said spring for effecting the aforesaid rotative adjustment of said spring; and locking means for retaining said rotatably mounted means in its adjustable positions.

3. A power transmission mechanism comprising a first universal joint assembly; a second universal joint assembly adjacently spaced axially from said first universal joint assembly; a centerplate close-coupling said universal joint assemblies for simultaneous rotation; each universal joint assembly comprising a yoke carried by said centerplate, and each assembly having a yoke positioned remote to a corresponding yoke of the other assembly, said yokes arranged in associated pairs; aligned anti-friction roller bearings on each yoke; spiders having radial arms journaled in said bearings for connecting the pairs of yokes of the respective assemblies; shafts connected to and carrying the respective remote yokes, and one of said shafts defining a motor driven shaft which is subject to vibrations incident to the operation of the motor; an elongate torsion spring extending through said centerplate, adjacent yokes and said spiders and connected at its ends to the respective remote yokes, and one end of said coiled spring being rotatably adjustable to vary the torsion thereof for maintaining the bearing rollers in parallelism during their approach toward loaded torque transmitting positions; and a rotatable radial arm for effecting adjustment of said spring.

References Cited in the file of this patent

UNITED STATES PATENTS

| Number | Name | Date |
|---|---|---|
| 2,042,513 | Daniell | June 2, 1936 |
| 2,499,569 | Cooley | Mar. 7, 1950 |